US006560580B1

(12) United States Patent
Fraser et al.

(10) Patent No.: US 6,560,580 B1
(45) Date of Patent: *May 6, 2003

(54) AUTOMATED AUCTION PROTOCOL PROCESSOR

(75) Inventors: Stuart A. Fraser, Armonk, NY (US); Howard Lutnick, New York, NY (US); Bijoy Paul, North Brunswick, NJ (US)

(73) Assignees: Cantor Fitzgerald, L.P. (CFLP), New York, NY (US); CFPH L.L.C. (CFPH), New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/294,526

(22) Filed: Apr. 20, 1999

Related U.S. Application Data

(62) Division of application No. 08/766,733, filed on Dec. 13, 1996, now Pat. No. 5,905,974.

(51) Int. Cl.[7] .......................... G06F 17/20; G06F 17/00
(52) U.S. Cl. ............................. 705/37; 705/35; 705/36
(58) Field of Search ............................... 705/35, 36, 37

(56) References Cited

U.S. PATENT DOCUMENTS

| | | | | |
|---|---|---|---|---|
| 3,573,747 A | * | 4/1971 | Adams et al. ................. | 705/37 |
| 3,581,072 A | * | 5/1971 | Nymeyer ...................... | 705/37 |
| 3,976,840 A | | 8/1976 | Cleveland et al. ........ | 379/93.02 |
| 4,412,287 A | * | 10/1983 | Braddock, III ............... | 705/37 |
| 4,677,552 A | * | 6/1987 | Sibley, Jr. .................... | 705/37 |
| 4,903,201 A | * | 2/1990 | Wagner ........................ | 705/37 |
| 5,038,284 A | | 8/1991 | Kramer ........................ | 705/37 |
| 5,101,353 A | * | 3/1992 | Lupien et al. ................. | 705/37 |
| 5,136,501 A | * | 8/1992 | Silverman et al. ............. | 705/37 |
| 5,168,446 A | * | 12/1992 | Wiseman ...................... | 705/37 |
| 5,243,331 A | | 9/1993 | McCausland et al. ........ | 345/172 |
| 5,297,031 A | | 3/1994 | Gutterman et al. | |
| 5,297,032 A | | 3/1994 | Trojan et al. | |
| 5,305,200 A | | 4/1994 | Hartheimer et al. | |
| 5,375,055 A | | 12/1994 | Togher et al. | |
| 5,717,989 A | | 2/1998 | Tozzoli et al. | |
| 5,915,209 A | | 6/1999 | Lawrence ..................... | 340/3.7 |
| 6,014,627 A | | 1/2000 | Togher et al. ................. | 705/1 |
| 6,134,535 A | | 10/2000 | Belzberg ...................... | 705/37 |
| 6,263,321 B1 | | 7/2001 | Daughtery, III .............. | 705/36 |

FOREIGN PATENT DOCUMENTS

| | | | | |
|---|---|---|---|---|
| GB | 2258061 | * | 1/1993 | ........... G06F/15/30 |
| WO | WO 95/26005 | * | 9/1995 | ........... G06F/17/60 |

OTHER PUBLICATIONS

Street Smart, "Getting Started", Jul. 1994, Charles Schwab & Co., Inc., pp 1–29.*

(List continued on next page.)

Primary Examiner—James W. Myhre
(74) Attorney, Agent, or Firm—Fish & Neave; Joel Weiss

(57) ABSTRACT

A data processing system for implementing transaction management of auction-based trading for specialized items such as fixed income instruments. The data processing system provides a highly structured trading protocol implemented through a sequence of trading paradigms. The system employs a distributed computer processing network linking together a plurality of commonly programmed controlled workstations. The protocol and its programmed controlling logic enhances trading efficiency, rewards market makers and fairly distributes market opportunity to system users.

31 Claims, 13 Drawing Sheets

OTHER PUBLICATIONS

Declaration of Stuart A. Fraser, Feb. 1, 2002.
Declaration of Howard W. Lutnick, Feb. 5, 2002. missing pages.
Declaration of Bijoy Paul, Jan. 31, 2002.
Declaration of James Bollinger, Esq., Feb. 19, 2002.
Declaration of Bradley Ruben, Esq., Feb. 5, 2002.
Cantor Fitzgerald Draft Confidential, Oct. 9, 1992.
Portions of the Super System Software Source Code.
Cantor Fitzgerald Securities Trading System Quick Reference Guide for Brokers, Oct. 1993, pp. 1–28.
Cantor Fitzgerald Inc. Digital Distribution System User's Guide, Dec. 1993, pp. 1–17.
Cantor Fitzgerald Trading System Description and Internals, Draft Jan. 21, 1994, pp. 1–50.
Cantor Fitzgerald Trading System Description and Internals, Draft pre–release Apr. 14, 1994, pp. 1–81.
Cantor Fitzgerald Trading System Description and Internals, Draft pre–release Apr. 22, 1994, pp. 1–90. (missing pp. 76 & 77).
Getting Started with CFTS Keyboard Entry Tutorial, May 1995.
Cantor Fitzgerald Screen Shots.
Super System Initialization Code.
Other Portions of Super System Software Code.
Super System Objectives.
Cantor Fitzgerald Trading System Descripition and Internals.
International Search Report, Mailed Mar. 26, 1998 for PCT/US97/22423.

* cited by examiner

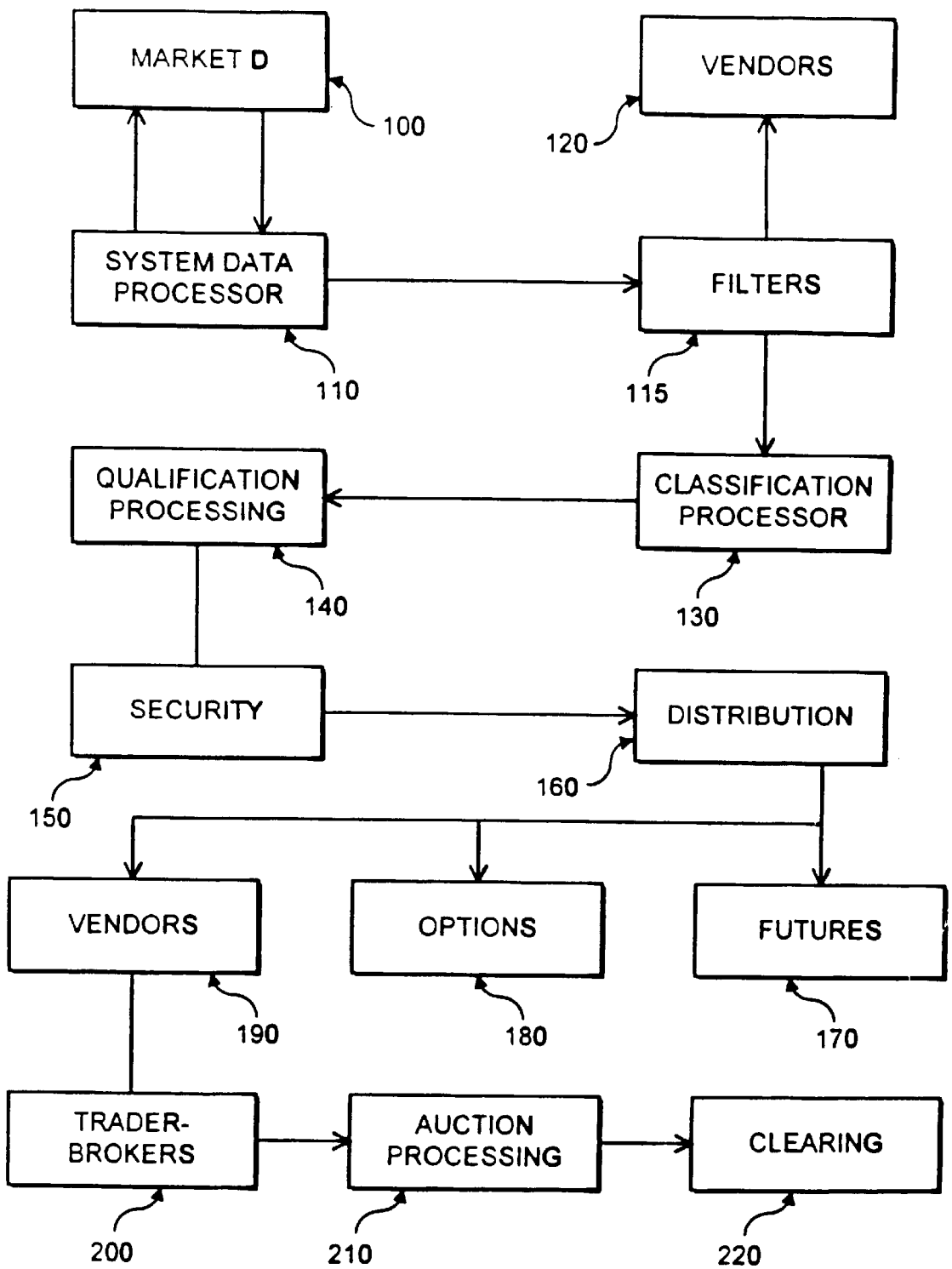
F I G. 2

AUTOMATED AUCTION PROTOCOL PROCESSOR

This is a division of application Ser. No. 08/766,733, filed Dec. 13, 1996, now U.S. Pat. No. 5,905,974.

FIELD OF THE INVENTION

The present invention relates to data processing systems for assisting in financial transactions. More particularly, the present invention relates to a data processing apparatus and method for the managed trading of select classes of securities or other commodities in accordance with specific protocols in an auction format with controlled sequence of auction events. The inventive system is presented in the context of selected fixed income auction protocols for fairly and quickly transacting offer-bid trading.

BACKGROUND OF THE INVENTION

Economic activity has at its centerpiece the buyer-seller transaction for all goods and services produced and consumed in a market economy. It is the fundamental mechanism to which resources are allocated to producers and output to consumers. The operation of the buyer-seller mechanism can and often is a critical determination of economic efficiency and when operated properly, will substantially enhance market performance.

Through history, there have been many different approaches adopted to bringing buyers and sellers together, each with the key objective of permitting transactions at or as close as possible to the "market" price of the goods satisfying. By definition, the market price is the price (in given currency terms) that a fully educated market, given full access will transact select goods. Discovery of the market price can only be accomplished by permitting full access to the transaction by essentially all potential buyers and sellers and allowing expression of each party's desires. However, the buyer-seller transaction must be structured to operate at very low costs—or it will distort the market price of goods with artificially high transaction costs. Thus, the two keys to effective buyer/seller transactions—full access of expression and knowledge coupled with low transaction costs—can be and are often conflicting, necessitating trade-offs between trading efficiency and market knowledge.

One well-known and particularly successful trading system is known as the "open outcry auction". This involves a process wherein buyers and sellers collect in one location and prices for select goods are presented to the group through a broker, via simple vocal offerings. This approach has been used for almost all to kinds of goods, but is particularly useful where there are no established trading locations or markets for the selected items. It is the dominate trading forum for exotic items such as rare pieces of art and the like. Although successful in bringing interested parties to the transaction, the overall process can be very expensive, adding significantly to the market-distorting transaction costs.

Open outcry auction techniques, modified over time, have also found successful application in many trading activities, including the buying and selling of farm produce and livestock, commodities contracts, futures contracts on a variety of items and—particularly germane to the preferred embodiment of the present invention—fixed income securities. These trading activities focus on the buying and selling of essentially fungible items, that is, items that are without meaningful differentiation from like items on the market. For example, a bushel of wheat for February delivery is considered for sale and delivery at a price independent of its source. Similarly, a 30-year U.S. Treasury bond paying a coupon rate of 8 percent and having a July 1996 issue date is indistinguishable from other 30-year treasuries having the same properties. Accordingly, the price buyers are willing to pay and sellers are willing to accept defines the market price of all 30-year treasury bonds of that same vintage, allowing a source transparent application of open outcry auction trading.

The fixed income securities issued by the United States government are known as U.S. Treasuries. These instruments typically span maturities of 13 to 52 weeks (T-bills), one to ten years (notes), and up to 30 years (Bonds). T-Bills are pure discount securities having no coupons. Almost all other Treasuries having longer terms are coupon notes or bonds, with a defined interest payment cycle of semi-annual payments to the holder. An additional and more recent type of Treasury.

Treasuries have characteristic properties that make them especially useful for the purpose of the present invention and, therefore, are used exclusively in the following discussions with the fundamental tenant that the principles may be applied to other types of fixed income securities without departing from the inventive concepts. One important attribute of treasuries, in the context of the present invention, is the minimal and uniform default risk; the issuance of U.S. government paper removes the default risk as a defining criteria in the relative pricing of treasuries in the market place when they are backed by the full faith and credit of the U.S. government.

New Treasury securities are auctioned by the U.S. government at preestablished auction dates. The auction prices for newly issued Treasuries having a face value with a set coupon rate defines the Treasuries' yields when issued. After the auction, the Treasuries enter the secondary market and are traded typically "over the counter," i.e., without a defined exchange. As inflation expectations and supply and demand conditions change, the prices of recently auctioned Treasuries fluctuate on the secondary market. The new prices are reflected by competing bid and offer prices communicated among institutions, banks, brokers, and dealers in the secondary market. For example, the yield of a treasury note increases as its price drops in the market, typically reflecting an overall increase in the interest rates for that term of security.

The newly auctioned securities are traded with and in conjunction with the securities issued in earlier auctions. In this context, some securities are traded more often than others and are called the "actives"; the actives usually correspond to the recently issued securities as opposed to the older securities in the market. Indeed, some older securities are infrequently traded, creating an illiquid market that may or may not reflect the current market-determined interest rate for that maturity length security.

Accordingly, the very size and diversity of the treasury market requires a high level of sophistication by market participants in the bidding, offering, buying, and selling transactions involving these securities. The very complexity associated with the transaction and the scale of trading undertaken by banks, brokers, dealers, and institutional participants necessitates a rigidly structured approach to trading.

In the past, open outcry auction bond brokering has served its customers well, providing highly efficient executions at near perfect market pricing. The open outcry auction applied to bond trading was implemented by a broker working with a collection of customers to create and manage a market. Typical customer representatives—both buyers and sellers—at a common location (e.g., a single room) where the representatives of the customers would communicate with each other to develop pricing and confirm transactions. This process employed the expression by the representatives of various bid and offer prices for the fixed income security at select volumes (i.e., how many million dollars of bonds at a given maturity). This expression would involve the loud oral "cry" of a customer-proposed bid or offer and the coordination with the fellow representatives regarding the extraction of complimentary positions—until a transaction match is made and a deal is done. This "trade capture" process relies on after-the-fact reporting of what just transpired through the oral outcry trade.

Recently, the trade capture process was performed by having designated clerks input data into electronic input devices. An input clerk would attempt to interpret the open outcry of many individual brokers simultaneously who sequentially are making verbally known their trading instructions of their customers. The quality of the data capture was a function of the interpretative skill of the input clerk, and the volume and the volatility of customer orders. A significant drawback to this type of auction data capture process is the difficulty in discerning the distinct trading instructions verbalized in rapid succession during a quickly moving market, so that an accurate sequence of data can be captured by brokers and a set of inputters.

The many permutations of this process will be discussed in detail below. At this juncture, suffice to say that, at lower volumes of transactions existing at the time of its development, and the lack of suitable alternatives, the open outcry auction process remained the dominant trading mechanism for decades. However successful, this approach was not perfect. Indeed, in recent years, some of the problems in an open outcry auction forum have been amplified by the vastly increased level of trading now undertaken in the fixed income field. Generally, difficulties would occur by the injection of trader personalities into the open outcry auction process. For example, a loud, highly vocal representative may in fact dominate trading—and transaction flow—even though the representative may only represent a smaller and less critical collection of customers. Although such aggressive actions at open outcry auction may be beneficial to those particular customers in the short run, overall, such dominance of the trading can and will distort pricing away from the actual market conditions.

Other problems exist in open outcry auction that deplete efficient trading. The speed at which trading flows and the oral nature of the auction process injects a potential for human error that often translates into many millions of dollars committed to trades unrelated to customer objectives. As such, the broker is left at the end of each trading day with a reconciliation process that may, under certain market conditions, wipe out all associated profit from that day's trading. Also, customers may quickly change direction regarding trading, based on new information available to the market. Shifting position or backing out of previously committed transactions on very short notice is often very difficult in the traditional open outcry auction process.

There have been many past efforts to incorporate computers into trading support for select applications and securities. Indeed, almost all trading today involves some computer support, from simple information delivery to sophisticated trading systems that automate transactions at select criteria. However, these systems have not significantly impacted the issues presented above as they relate to open outcry auction trading in the fixed income field. It was with this understanding of the problems with certain trading processes that formed the impetus for the present invention.

OBJECTS AND SUMMARY OF THE PRESENT INVENTION

It is, therefore, an object of the present invention to provide a data processing system to implement a trading system capable of high volume trading activity.

It is another object of the present invention to provide a data processing method supporting a transaction enabling process for trading securities at accelerated levels with few errors and low costs.

It is yet another object of the present invention to provide a data processing system to support a formalized trading protocol governing the control of trading on a bid/offer market.

It is also an object of the present invention to provide a system for collecting, displaying and distributing in real time information on current market activity in fixed income securities and processing this information to quantify the extent of order and trading activity of customers in real time.

It is another object of the present invention to provide an apparatus for the select processing of several types of data wherein data is qualified prior to use, and for translating the qualified data into order and trading states for fixed income securities.

It is still another object of the present invention to provide a data processing system that provides controlled access to trading commands pursuant to preestablished trading criteria.

It is yet another object of this invention to provide a computer system that includes multiple workstations linked by high speed communication paths to permit rapid distribution and exchange of market data to participants.

It is still another object of the present invention to provide a system that rewards customers that create liquidity while insuring customer orders are satisfied in an orderly and equitable fashion.

It is yet another object of the present invention to provide a database system linked to the auction processor for collecting, filtering, and distributing select market data in near real time.

It is another object of the present invention to provide a computer system with a dedicated input system for a workstation, that is customized for the trading undertaken by that workstation and may be customized to the trading patterns and customers for a given broker at that workstation.

Yet another object of this invention is to provide timely order checkout.

Still another object of this invention is to provide customized trading tools particular to a given customer, such as stop limit orders, contingent orders, flags (warnings) to the broker that a particular customer has reached a trading limit (e.g., margin limit), and the like.

A further object of this invention is to utilize the present system for the trading of other financial products, such as futures, indices, and the like.

The above and other objects of the invention are provided by a computer-based, data processing system having program controlled logic for managing select trading. The data processing system employs a plurality of trading workstations linked with a server for coordinated data flow and processing. Communication is provided by a network, such as, for example, an Ethernet, token ring, token bus, or other hierarchical LAN and/or WAN configuration. The system preferably includes a dedicated keypad for input at each workstation that provides individually programmed keystroke commands; alternatively, other keyboards, keypads or voice controlled electronic devices can be used with the present system. Central processing logic dictates the available order, trading and allocation options, and screen displays for each workstation. As orders and transactions are entered, various protocols affect the allocation of bid-offer control, priority generation, exclusive trading time, and interactive trade management. As trades are completed, the system updates a linked database with newly entered transactional data.

In accordance with the present invention, the controlling logic provides a sequence of trading states for each participant. The five states are:

TABLE 1

| (i) | Workup State |
| (ii) | Bid-Offer State |
| (iii) | Second Look State |
| (iv) | When State |
| (v) | Workdown State |

As various transactions are entered, workstations operate in one of these five states. The workstation "state" determines the options available to that trader—and thus controls the flow of orders and trades in a cost-efficient and error-free manner. While participants may implement trading on similarly configured workstations, the protocols are universal for all traders, thereby precluding aggressive control of transactions without true capital commitment.

The foregoing features of the present invention may be more fully appreciated by review of specific illustrative examples thereof, presented hereinbelow in conjunction with a descriptive set of figures.

BRIEF DESCRIPTION OF THE FIGURES

FIG. 2 provides a flow diagram depicting the transmission of trading related information;

DETAILED DESCRIPTION OF THE INVENTION

Figure 1:
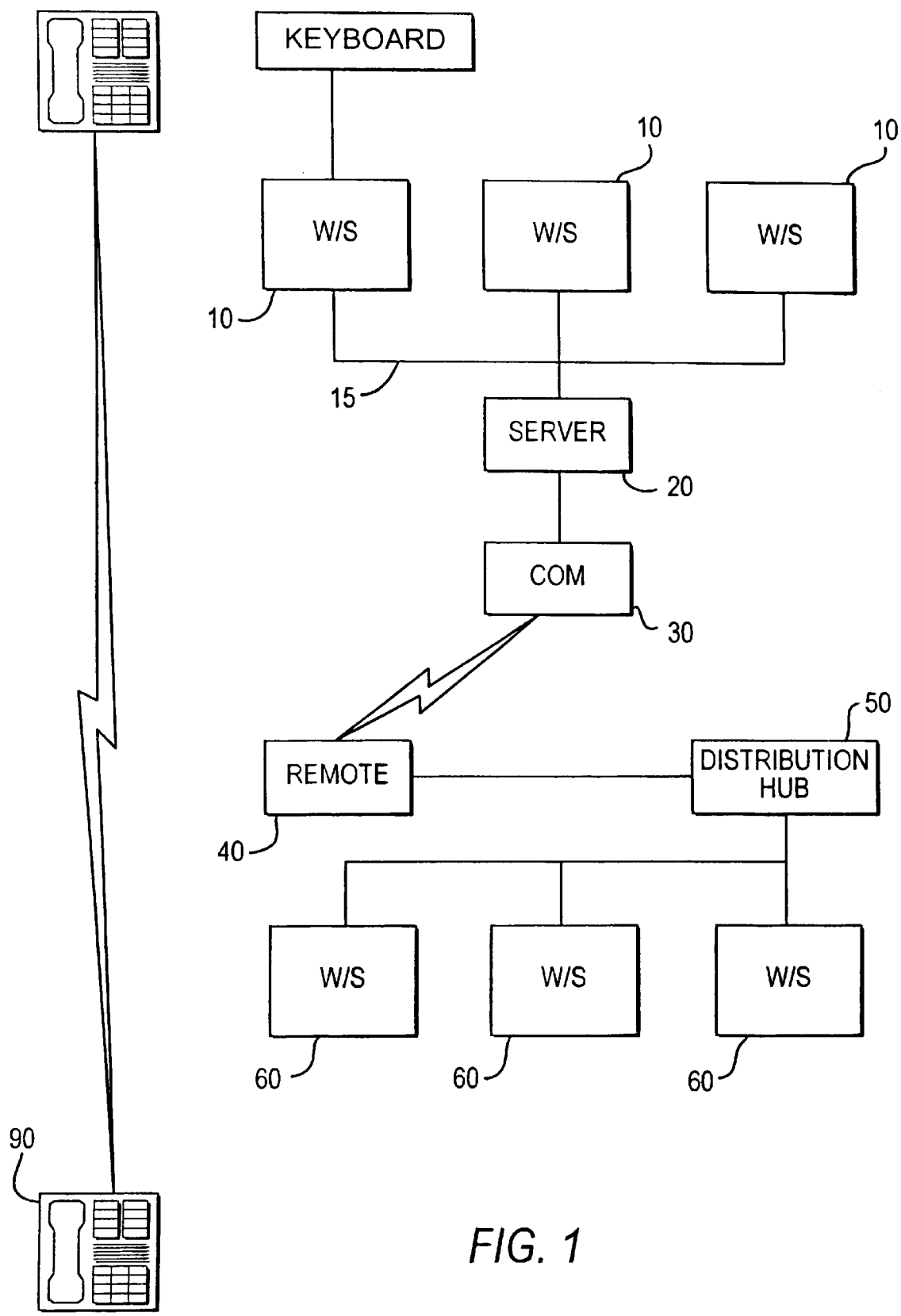
FIG. 1 is a system block diagram depicting the salient hardware components of the present invention.

The present invention is directed to a data processing system for implementing complex trading rules in support of select transactions. The first aspect of the invention relates to a particular hardware arrangement that provides a specifically tailored platform for processor enhanced and supported trading. This hardware arrangement encompasses a plurality of custom designed workstations linked together for communication. Each workstation is linked to a central server that orchestrates the trading process in accordance with program controlled logic. The workstation includes a display for presenting the particulars of trading activity. A customized keypad permits enhanced data/position entry by the broker.

The second aspect of the invention is the governing logic for controlling system dynamics. This logic is stored in system memory and provides the sequence of protocols and rules that allocate trading priority. The logic also provides system responses to operative commands entered by the brokers at the workstations. The system logic is important in two ways. First, it is important as the guiding principles underlying the system and thus performance is tied directly thereto. Second, system logic must be known to all participants as the rules dictating market access and response—to eliminate any confusion and to place participants on as close to an equal footing as possible. The system preferably provides fair and complete access to the trading process to all registered participants.

To better appreciate the following details, the nomenclature is defined below. The illustrative examples herein all focus on fixed income instruments and the trading of these instruments in large volumes—with the volume of a given transaction delineated in, but not limited to, dollars (e.g., $125 million of 10 year treasuries).

TABLE 2

| Bid | Dollar amount offered to buy a security - issue. |
| Offer | Dollar amount offered to sell a security - issue. |
| Spread | Difference between best bid(s) and offer(s) on market. |
| Issue | A common class of fixed rate treasuries. |
| Hit | Accepting a pending bid. |
| Lift | Accepting a pending offer. |
| Size | The volume in dollars of a particular Bid/Offer. |
| Makers | Customers with pending offers and bids - making a market. |
| Uncleared Entry | A bid or offer that cannot be traded for a given time by certain participants. |
| Traders | After a trade is initiated, all customers involved in transactions (as buyer or seller). |
| Trade | A string of transactions at one price initiated by a hit or lift and continuing until timed out or done. |
| Aggressor | A customer who initializes a trade. |
| Active Side | Group of Makers on same side of market as the Aggressor |
| Passive Side | Group of customers on opposite side of market from the Aggressor. |

The general context of system operation is based on the repetitive operation of several functions, and, in its preferred embodiment, implements these functions through a specially designed keypad. Generally, the process begins when customers contact the brokers and place bids and offers for a defined class of instruments. Alternatively, bids and offers may be entered by a customer using a remote workstation. These various positions are displayed on the computer terminal in specific ways to reflect priority, etc. A customer can establish trading priority by placing a bid or offer at a select price and volume; bids at the same price are displayed on the screen in time order in which they enter the system (as are offers). As such a "queue" of bids and offers develops, with place in line set by time at the same price. This queue is displayed on screen at the broker's workstation. Typically, there is a small difference between the bid price and offer price—the "spread". If no difference exists, this is known as a "locked" market.

Importantly, a bid and offer are commitments—once placed, a bid can be "hit" and an offer can be "lifted" by a customer willing to trade the instrument at the set price.

To control trading between many Participants, a level of hierarchy is set. A customer who hits on a bid or lifts an offer is promoted to a new level known as the "aggressor". By acting on a bid or offer, the aggressor defines (and thus establishes) the active side of the trade. For example, if the consumert hits a bid, selling becomes the active side of the trade and buying turns passive. However, if the customer lifts an Offer, buying is active. This is an important practical consideration, as by convention the active side pays commissions on the ensuing transactions. This allocation of commissions is premised on the notion that the active customers are taking advantage of liquidity—while the passive side is supplying liquidity to the market.

For controlled implementation, the above-noted delineation between active and passive sides is important and carries more significance in processing transactions than the different sides of the transaction, i.e., the bid and offer.

Focusing further on the nomenclature for the system logic, a "trade" is considered a sequence of trading events, triggered by the initial hit or lift that defines the aggressor, and continues for all such transactions until the trade "clears". During a trade, the aggressor side remains active and all transactions take place at the price set by the initial hit or lift—regardless of the number of following transactions. To properly track activity, a trade generates a (virtual and/or real) single trade ticket—with associated, and screen-displayed, reference number.

FIG. 1 depicts the various hardware components found in an operative embodiment of the present invention. In this context, a plurality of workstations 10 are provided, each individually linked to a central server 20 via network lines 15. Server 20 includes controlling software for managing the interaction of the dataflows to the individual workstations 10 in accordance with system constraints.

Continuing in FIG. 1, the system may be linked to brokers and customers at remote locations. Access to trading activity is accomplished to Communication Server 30 and Remote Server 40 to a remote distributor hub 50 and remote workstation 60. Supplemental communication lines are utilized via conventional phone link 90. The above platform further includes a 32-bit operating system to manage the multitasking environment within the network. The present invention has been successfully implemented using the OS/2® operating system; however, other operating systems may be substituted. The workstation design can be selected from Pentium® processor based PCs, SPARC Station® (using UNIX®) or other microprocessor based systems.

Now turning to FIG. 2, the overall information paths of the present invention are presented in block diagram form. This market information is derived from the auction process and is a highly valuable source of data to related markets (futures and options). Beginning with block 100, market data is collected from the plurality of on-line terminals operated by brokers within the relevant bond market sector. A continual exchange of information flows between the brokers, depicted in block 100, and the system proprietor, block 110, i.e., as bids, offers and trades are transacted in real time. This information is collected by the system proprietor and entered into the data processor database.

On-line market data is then transferred to the data filter and enhancer module, block 115, which acts to clarify and articulate the continuous incoming market data for use, e.g., by data accumulators, block 120. One aspect of the data enhancer operation will be the conversion of on-line trading information into digital form for transmission to the classification processor, block 130. The operation of the classification processor is directed to creating a data set in proper format for further manipulation. This includes the generation of a coordinated array of data in matrix format.

Once properly formatted, the on-line market data is then transmitted to the qualification processor, block 140, for determination for a real time command selection. The information is then loaded into the security database, block 150, and then passed to the distribution processor, block 160.

The foregoing operation will result in the real time distribution among work stations for decision execution and for select distribution within the fixed income investment community. In the context of the present invention, three segments of this community are provided with the data. At block 180 and block 170 system proprietors involved in automated options and futures processing are provided the securities data for quantifying and evaluating specific options and futures positions pursuant to the trading of option and futures contracts on individual securities. In a similar manner, the securities data is provided to system proprietors regarding options and futures contracts to permit proper transactions in the trading of options and futures contracts based on the individual securities data.

The third channel of distribution for the Securities data is to the data accumulators and vendors at block 190. This is followed by the continual distribution of the securities data to traders and brokers within the investment community, block 200, the support of automated trading, block 210, and finally declaring and reporting functions associated with such trading, block 220, to include clearance operators among others.

The trading activity is highly fluid and fast paced. Accordingly, efficient input systems are important to effectuate the multiple options and the use of a highly specialized keypad that permits these levels of efficiency in the present context. Accordingly, a separate aspect of the present invention is the unique keypad depicted in FIG. 3.

During processing, various "states" are reached, depending on the type of inputs received by the system. The core state is the "Bid-Offer" State and reflects the open status, of the market. In this state, customers are referred to as "makers" and "contra-makers"; during all other states, customers are considered "traders" and "contra-traders". Under this notation, traders and makers are those customers that issue a trading command, while contra-makers and contra-traders are those who receive a trading command. The initial participants in the Workup State (i.e., the Aggressor and the first customer on the passive side) are known as "current workers" and are vested with the authority under system control to hold up a trade for a predetermined duration of time. Important character distinctions between customers at various stages of trade processing are displayed to the broker on screen by reverse highlight or similar.

Figure 4:
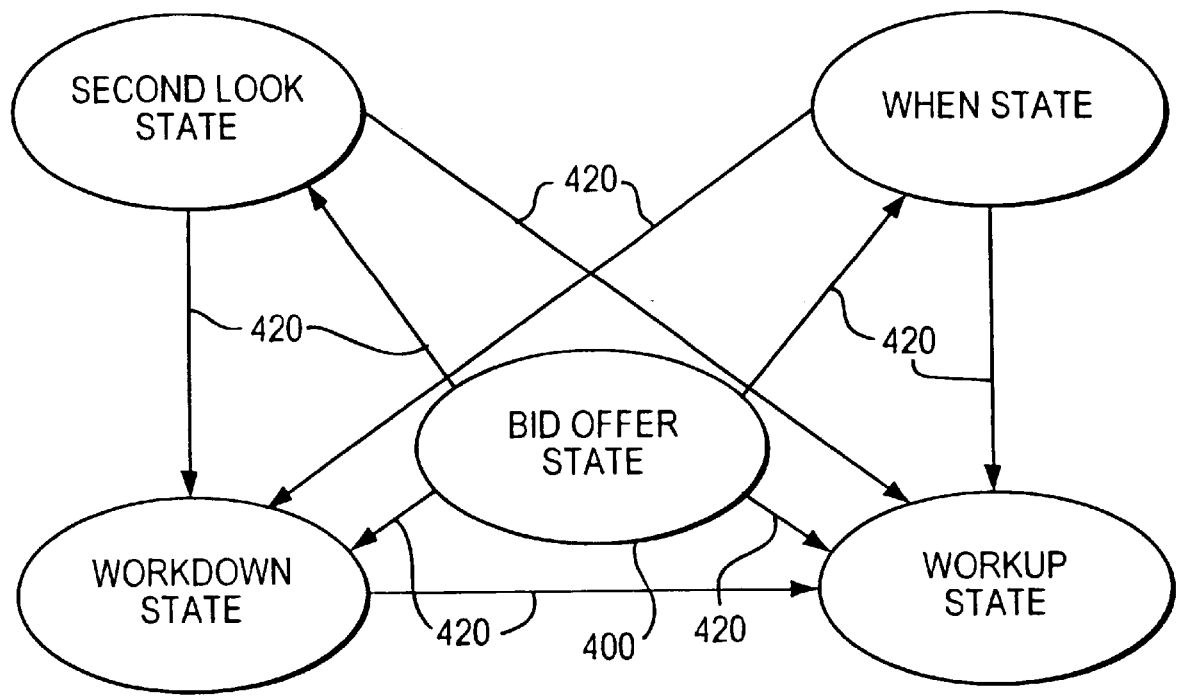
FIG. 4 is a block diagram of the various system states and pathways therebetween.

The interrelationship of these five system "states" is depicted in FIG. 4. Initial trading is always predicated on the Bid/Offer State, 400, with the sequence process, 420, assessing system inputs for a change of current state. As inputs are entered, a state change is triggered and processing shifts to the paradigms associated with (i) When, (ii) Workup, (iii) Workdown, and (iv) Second Look. As each state is entered, the protocols are shifted and new rules to trading apply.

Information about trade progress and participants are provided at each workstation in the form of a specifically oriented screen display. In particular, the system provides for screen display in the form of a trading quadrant or "quad" wherein key trading indicators are displayed. A sample QUAD for the bid/offer state is depicted below:

|  | QUAD 1 | | | | |
| --- | --- | --- | --- | --- | --- |
| 100.01 |  | 2 | 100.03 |  | 15 |
| CUST | Bid | Bot | Cust | Offer | Sold |
| 2001 | 1 | 0 | 2007 | 5 | 0 |
| 2002 | 1 | 0 | 2006 | 10 | 0 |
| TOTL | 2 | 0 |  | 15 | 0 |

In the above QUAD, the current bid is depicted adjacent and above the CUST designation—reflecting a bid price of "100.01"; continuing on the same line, the current offer price is set at "100.03"—indicating a spread of 0.02. When a trade is in progress—as initiated by a hit or lift from the Bid/Offer State, the broker's attention is mainly directed to the conditional prompt showing the total size that is being bid or offered and that can be acted upon by the participating customers. This number is displayed at the intersection of the totals line and one of the bid/offer columns. This total is further refined in the quad into individual prequantities, indicating the customer sizes in their respective rows.

Above the BOT and SOLD captions in QUAD 1, a second totals counter provides the Makers total size. In the Bid-Offer State, this total is the same as the conditional prompt because no trades have been executed. This changes after the first transaction when a "traders list" is created—and the conditional prompt tracks the traders total, while the Maker's total keeps track of quantity left in the Maker's list.

Figure 5:
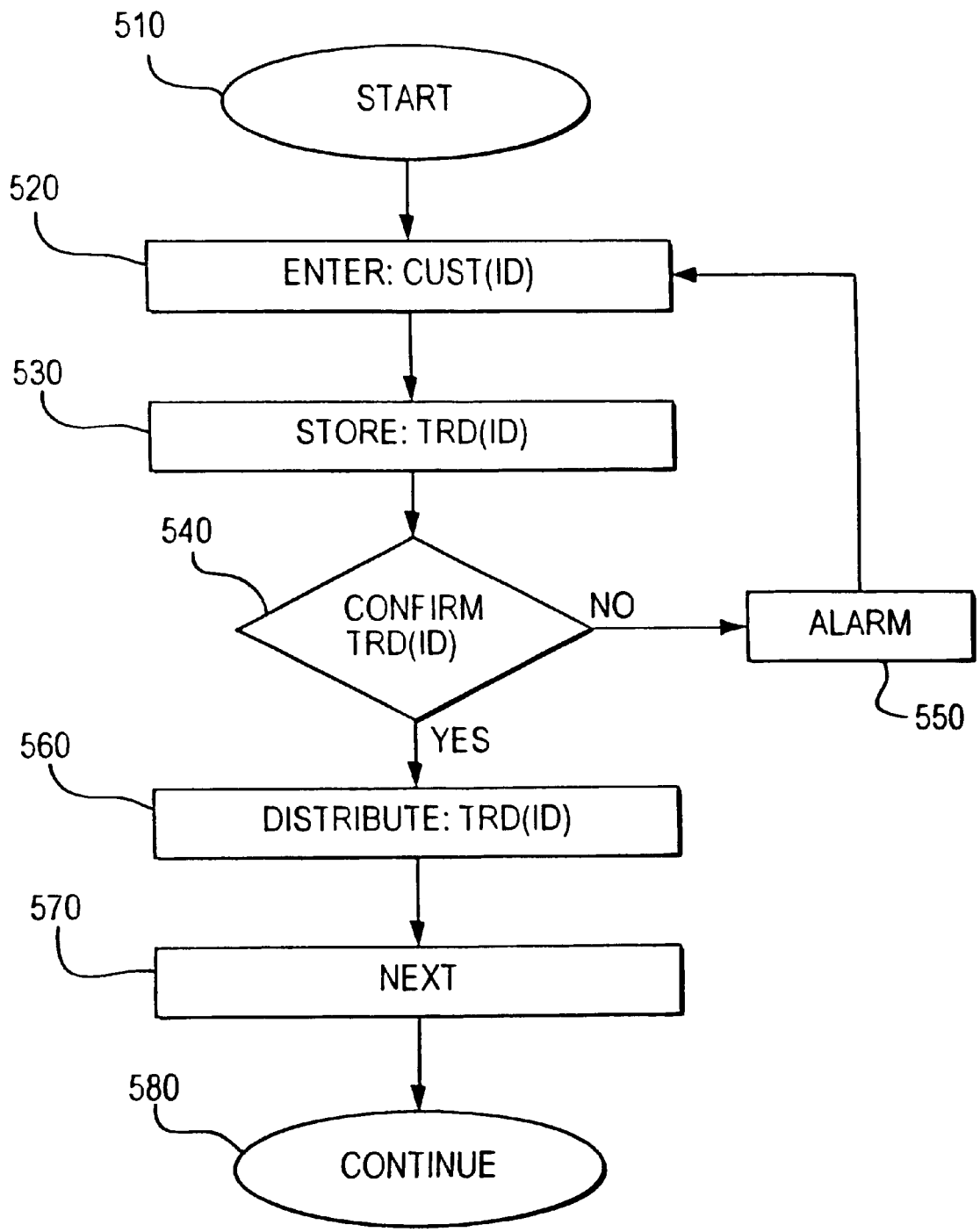
FIG. 5 is a logic diagram for trading data input.

Turning now to FIG. 5, the data selected for display on the QUAD is processed in accordance with depicted logic. The system enters a new CUST(ID), block 520, e.g., "2001" and stores this in active memory with associated trade data/command TRD(ID), block 530. The trading command is confirmed at a systems level, i.e., rejecting system errors via Alarm, at 550. Once confirmed, the new data/command TRD(ID) is distributed to the screen buffers for the associated work status for display, block 560. This is repeated for each new entry, block 570.

The following discussion now focuses on the Bid/Offer State, wherein market makers are inputting various bids and offers into the system while waiting for an execution as the market matures. These pending commitments may be acted upon via hit or lift commands entered by makers currently showing or by a third party without showing its position prior to the hit (or lift). As new bids and offers are made, the price attendant therewith determines the placement in the queue, with equally priced offers (or bids) ordered in time entry. Accordingly, as the market tightens with better bids and offers (reducing the spread), these new positions are moved to the top of the queue as displayed.

In addition to price, bids and offers include a size component, that is used to express the dollar volume of the pending bid (or offer). For a customer to increase the size of the bid or offer, a new entry is made, and placed into the queue separately as the system will not increment the size component—unless the entry was made adjacent in time to an existing Bid/Offer already in the queue. In this way, as bids and offers are entered during this state, they are displayed to the brokers in relation to their respective size, with the total Bid/Offer count (aggregate size) displayed at the above noted conditional prompt. As such, the conditional prompt serves as the main impetus for a transaction due to its measure of apparent market capacity at a given price.

A Bid/Offer is typically entered as "uncleared" during the Bid/Offer State—indicating that the bid or offer is only available to the current market participants on the contra-side, i.e., those on the list with current commitments (bids/offers). Accordingly, uncleared presentations are seen on the screens as available to only these participants for a system set time interval—and only those customers with current participation can lift or hit these uncleared entries. After the preset time interval has run (tracked by a system internal clock) the uncleared bids/offers—if still extant—become available beyond the current participants. There is a business purpose for this arrangement. By allowing customers with active bids/offers the first chance for the new entry, this rewards these customers for showing the market on their side. Thus the initial bidders/offerors are invited to become Aggressors—and the system preset interval provides these bidders/offerors time to make their decision by preventing new buyers and sellers from entering into the trade (i.e., hitting or lifting) for this discrete interval.

Figure 6:
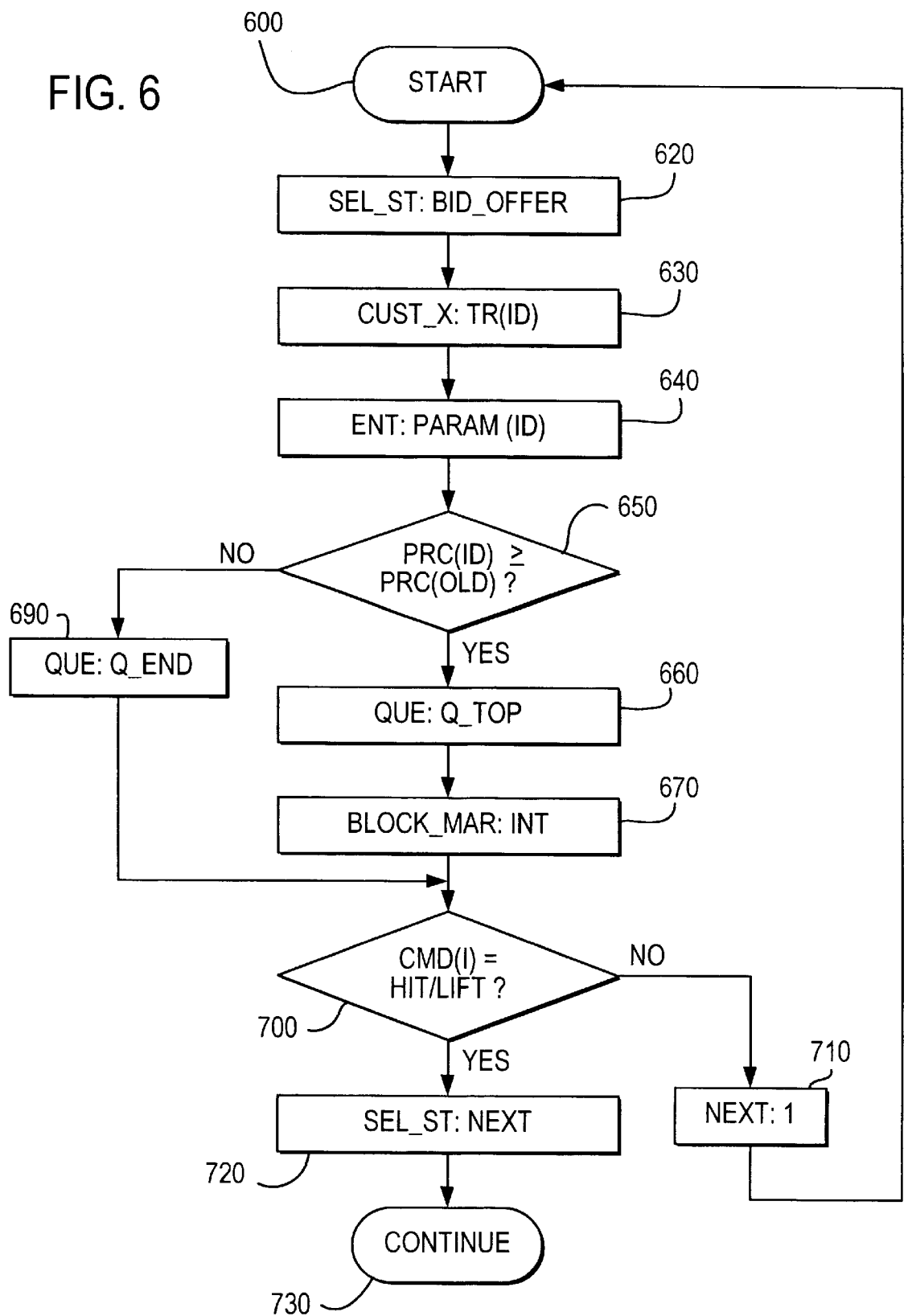
FIG. 6 is a logic diagram for the Bid/Offer State.

The system in logic associated with the Bid-Offer State is depicted in FIG. 6. Logic conceptually begins at block 600, with the data/command entry block at 620. The State Selector qualifies the State as Bid/Offer, block 620. At block 630, the CUST X profile is taken from the new entry and all associated data passed into a parameter string, block 640, which is entered.

Continuing with this logic path, test 650 compares any Bid/Offer pricing associated with TRD(ID) to then pending bids and offers to discern whether the new entry improves on current pricing; if not better, logic branches to block 690 and the new entry is placed at the end of the queue, Q-end. However, if the new pricing, PRL(ID) is better than the old (then current) pricing PRC(OLD), logic brings the new CUST_X to the top of the queue, block 660; also, the market is blocked allowing only the current makers (displayed) to react to the new pricing for a pre-set time, block 670.

At test 700, system checks for a new hit/lift; if none, logic continues to the next entry, block 710. A positive response to Test 700 shifts processing to the next state, block 720.

The screen display will change according to the various entries into the bidding process. In QUAD 2 depicted below, customers 3001–3003 on the bid side reflect a market of 27 million; see conditional prompt: 27. This includes a first bid by customer ("CUST") 3001 of 5.0 million, followed a little later by a second bid of 20 million. In this example, CUST 3007 (could be a bank or other institutional participation) has entered the picture with an uncleared offer of 10 million (marked by asterisk—indicating offer is uncleared); this is the 10 million depicted on the conditional prompt line on the offer side. As such, controlling logic gives the original makers the first chance for the new offer by 3007. After the interval, the market is again opened and the asterisk is removed.

|  | Quad 2 | | | | |
| --- | --- | --- | --- | --- | --- |
| >7.625 225 |  | TZ |  |  |  |
| 108.04 |  | 27 | *108.04+ |  | 10 |
| Cust | Bid | Bot | Cust | Offer | SOLD |
| 3001 | 5 | 0 | 3007 | 10 | 0 |
| 3002 | 1 | 0 |  |  |  |
| 3003 | 1 | 0 |  |  |  |
| 3001 | 20 | 0 |  |  |  |
| TOTL | 27 | 0 |  | 10 | 0 |

The When State is triggered by a trading command against an uncleared Bid/Offer by an Aggressor who is not one of the original makers on the contra-side. However, system controls will not allow this trading command by the new Aggressor to be instantaneously executed. In accordance with system logic, the trading processor creates s a time interval or delay, and thereby provides the original Maker(s) time to assess the new situation created by the Aggressor by permitting response to the uncleared entry on the passive side.

In particular, as noted above, the uncleared status exists for a defined interval—controlled by computer driven timer. It is only during this interval that a When State can be instituted, which can then only last until resolved by either the action of the first best original Makers on the active side, or by the expiration of the interval timer within system logic.

During When State processing, the system displays the original Makers—existing with Bid/Offers outstanding prior to the entry of the new Aggressor—and the new Trader(s) entering via hit or lift commands on the pending uncleared Bid/Offer; these Makers and Traders are clearly separated on the screen. (See QUAD 3B below). Importantly, these original Makers are given the opportunity to trade at the new price point established by the Aggressor; multiple makers from the original list will each have access to take the new price in the order of their priority in the queue. The system will increment through each Maker; if one issues a buy/sell order at their size, they become the Aggressor. If this occurs, the logic departs the When State and can either enter the Workup State or Workdown State depending on whether the new Aggressor takes the entire volume indicated at the conditional prompt.

Once When State processing has been initiated, no trader entries from the passive side are permitted and customers are blocked from entering on the active side, if they represent the only customer input from the passive side previously. Entries on the uncleared (active) side will come from new traders, extant traders, or the original makers which drive the system back to the Bid/Offer State preceding a trade. If, for example, a trade has 10 offered and 5 are "up", during the When State the trader preferably can cancel the amount which is not yet committed.

However, if the second interval timer expires without any intercession by the original Makers, the When entries (one or several) will automatically trade—and the original Makers will not part take in this trade. During the interval, WTAK flashes on screen to the Makers showing a take on the uncleared offer, WHIT will flash for a hit on an uncleared bid. During this interval, the size entries for pending Makers are all initialized to zero, and no longer presented at the conditional prompt.

Figure 7:
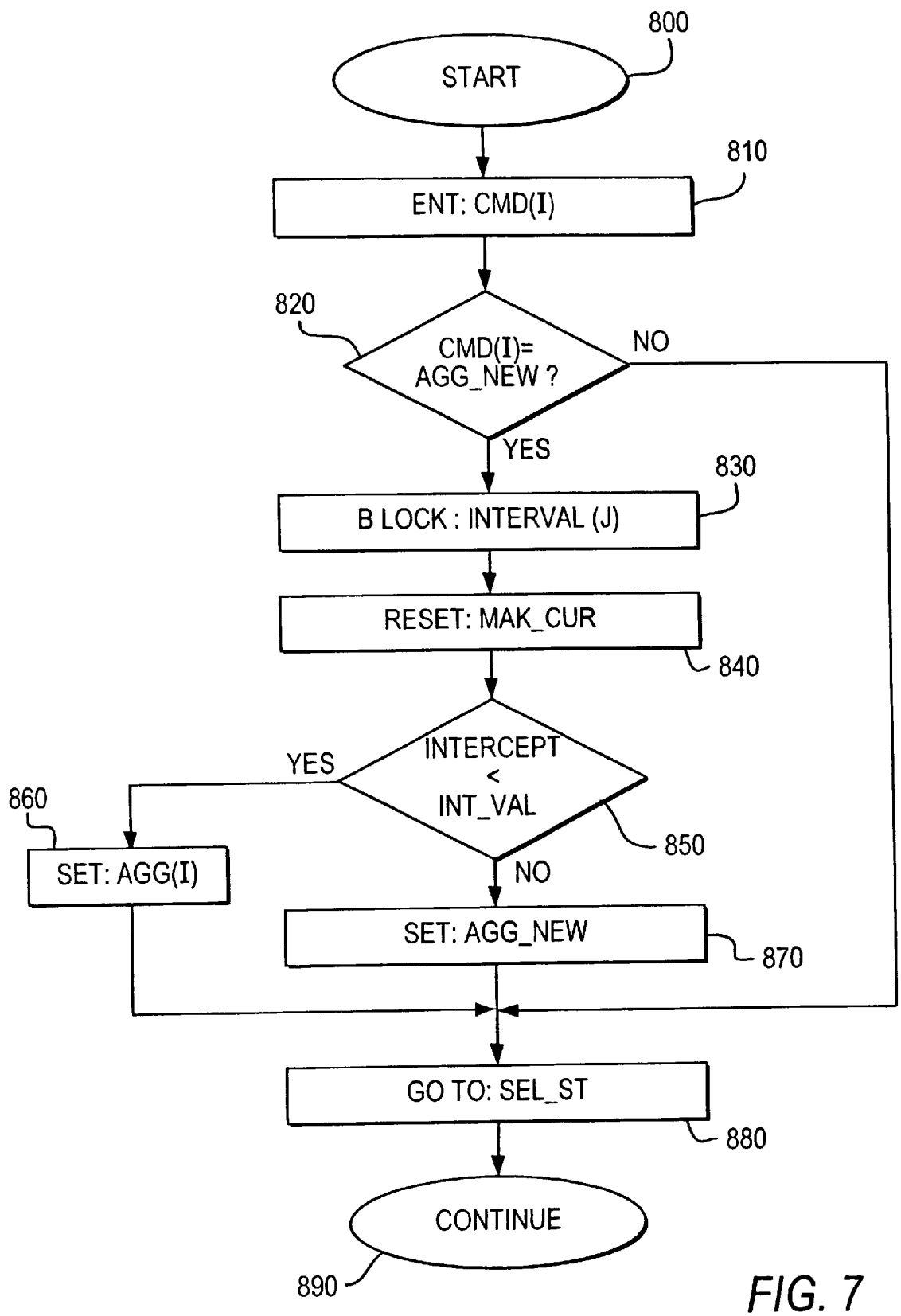
FIG. 7 is a logic diagram for the When State.

When State processing is depicted in FIG. 7 and is triggered by a trading command CMD(I), block 810. Test 820 confirms that the new trading command (Hit or Lift) is from a new Aggressor; if not, logic continues to block 880 and to either Workup or Workdown State.

However, a positive response to Test 820 branches logic to block 830, wherein the market is blocked for a pre-set time interval. At block 840, all then-current active-side makers are reset to zero. At test 850, the system determines if these makers intercept the Aggressor before the time interval expires. If yes, the intercepting maker becomes the Aggressor, block 860, with full control over the succeeding trade sequence. If not, the new Aggressor is set, block 870, and logic continues to the next State, block 880.

The following sequence reflects the foregoing system logic. In QUAD 3A below, the Bid/Offer State has two customers, 3003 and 3002 each showing bids at 10 million; customer 3007 has just placed an uncleared offer for 1 million. Customer 3001 wishes to lift the new offer by customer 3007—but he can't automatically. In QUAD 3B below, customer 3001 attempts to lift the offer by customer 3007 forcing the system into the When State, and creates an uncleared list for the active side (bid here). However, the prequantity of the first two bidders is reduced to zero—as the system logic requires that these bids cannot be enforced at the new price point (108.04+). In this example, the second interval timer provides both original Makers (3002 and 3003) priority over customer 3001; with customer 3002 retaining overall priority via its placement in the queue.

| QUAD 3A | | | | | |
|---|---|---|---|---|---|
| >7.625 225 | | TZ | | | |
| 108.04 | | 20 | *108.04+ | | 1 |
| Cust | Bid | Bot | Cust | Offer | SOLD |
| 3002 | 10 | 0 | 3007 | 1 | 0 |
| 3003 | 10 | 0 | | — | — |
| TOTL | 20 | 0 | | 1 | 0 |

| QUAD 3B | | | | | |
|---|---|---|---|---|---|
| >7.625 225 | | TZ | | | |
| 108.04 | | 20 | 108.04+ | WTAK | 1 |
| Cust | Bid | BOT | Cust | Offer | SOLD |
| 3002 | 0 | 0 | 3007 | 1 | 0 |
| 3003 | 0 | 0 | | | |
| 3001 | 1 | 0 | | — | — |
| TOTL | 1 | 0 | | 1 | 0 |

Transactions forming a trade take place in accordance with the present invention during one of two trading states, known as the Workup and Workdown States. The Workup state occurs pursuant to hits or lifts by an aggressor taking the entire inventory of volume shown on the passive side; once established, the Workup State gives exclusive rights to the trade to the initial traders—who the system recognizes as the current workers. On screen, current workers are highlighted in a defined manner known to other participants. Current workers control the trade and can submit additional transaction volume to their contra-traders; this to the exclusion of outside customers. Current workers on the active side of the trade will include the Aggressor, and possibly other traders, below the Aggressor with transactions that move the trade into the "Workup" State by filling residual volume that needs "Workdown". For the passive side, an Aggressor that takes the entire size limits current worker status to himself and his counterparty.

The status of current worker dissipates upon entry of "done", or the lapsing of the trading inactivity interval. Again, this interval is a pre-set system parameter triggered via system logic. Absent such termination, current workers can trade almost indefinitely, as long as they continue to respond to their contra-party's size offerings.

Figure 8:
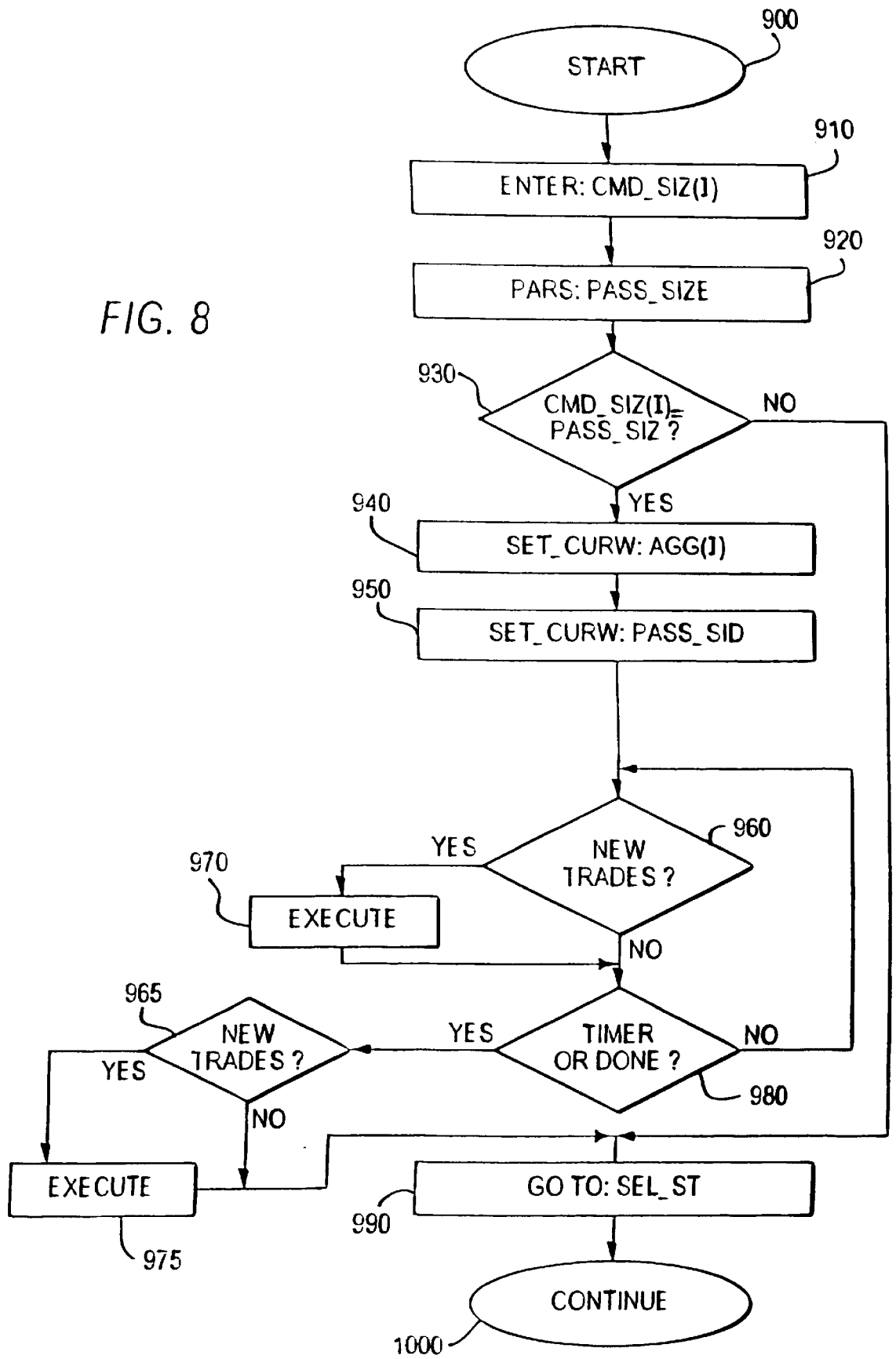
FIG. 8 is a logic diagram for the Workup State.
Figure 9:
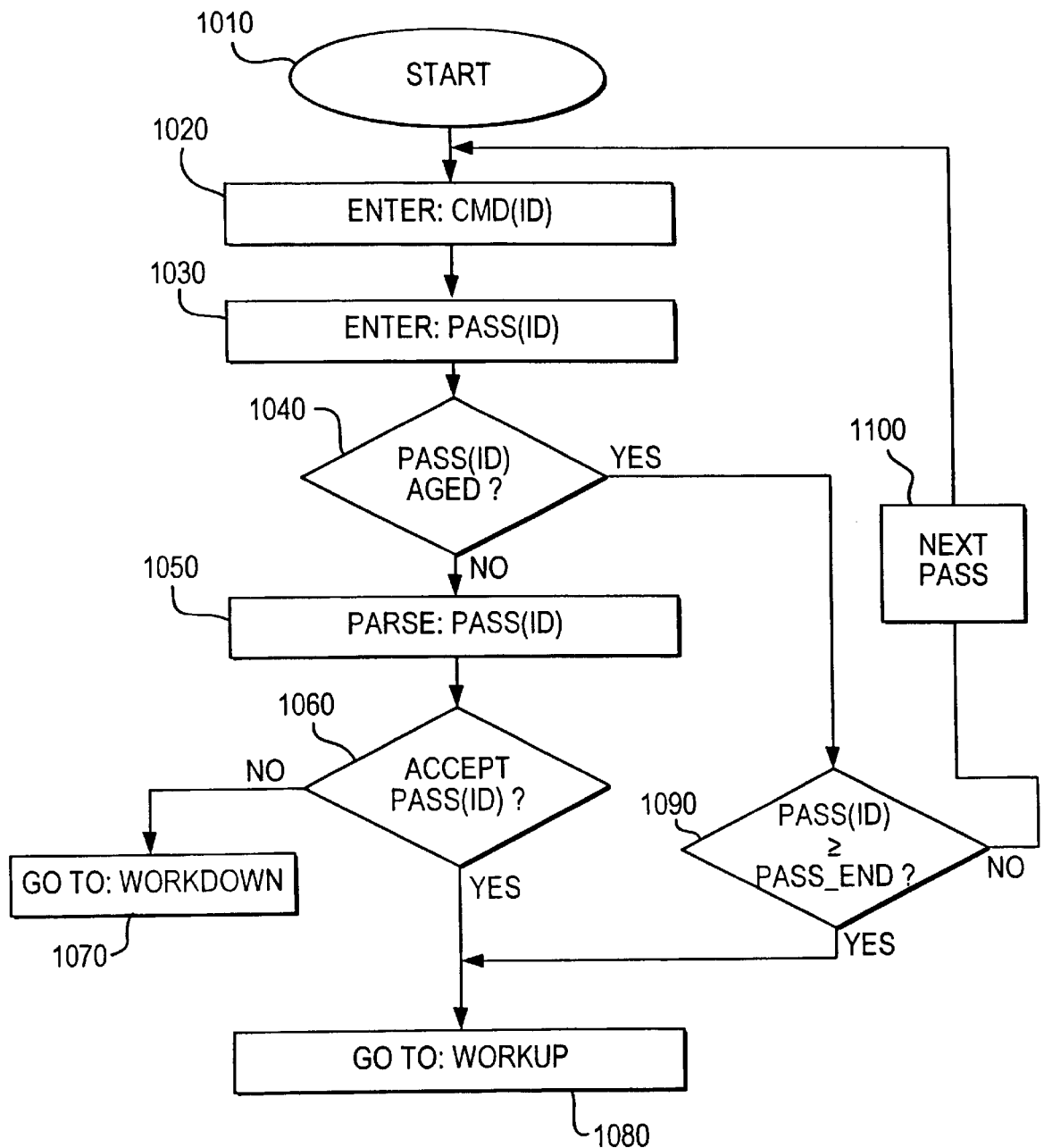
FIG. 9 is a logic diagram for the Second Look State.

The Workup State logic is depicted in FIG. 8 and is principally tied to size and new order data. The Aggressor size is entered as is the passive side prior to trade entry, blocks 910 and 920, respectively. At test 930, the system determines if the Aggressor has taken the entire market offering at time of trade; if "no" to test 930, logic continues to block 990 and ultimately the Workdown State (FIG. 9).

A positive response to Test 930 passes logic to blocks 940 and 950 wherein the current workers are assigned and new tradesentered by the current workers, to the exclusion of other customers. The system tests for new trades, Test 960, and processes these accordingly, block 970. This continues until the current workers are done or timed out, Test 980. The system then tests for (block 965) and executes (block 975) any new transactions entered (via hit or lift commands) by new customers.

The above logic is better understood in the context of a particular example. As shown in QUAD 4A below, a typical opening Bid/Offer display is presented.

| >7.625 225 108.04 Cust | Bid | TZ 16 BOT | 108.05+ Cust | Offer | 45 SOLD |
|---|---|---|---|---|---|
| QUAD 4A | | | | | |
| 3001 | 5 | 0 | 3007 | 25 | 0 |
| 3002 | 5 | 0 | 3006 | 10 | 0 |
| 3003 | 1 | 0 | 3005 | 10 | 0 |
| 3001 | 5 | 0 | | — | — |
| TOTL | 16 | 0 | | 45 | 0 |

Assume the bid is hit by CUST 3005 selling the entire size (16 million) to the passive side. This results in CUST 3005 as the Aggressor and the contra-trader (CUST 3001) as the current workers (as indicated by highlighting or reverse video). It is now the Workup State as the Aggressor has taken all initial size from the passive side. See QUAD 4B.

| >7.625 225 108.04 Cust | HIT Buy | TZ 16 BOT | Refno 68119 +108.05+ Cust | Sell | 36 SOLD |
|---|---|---|---|---|---|
| QUAD 4B | | | | | |
| 3001 | 0 | 10 | 3005 | 0 | 16 |
| 3002 | 0 | 3 | | | |
| 3003 | 0 | 1 | | — | — |
| TOTL | 0 | 16 | | 0 | 16 |

CUST 3002, wishing to continue, adds an additional 5 million size (adding to CUST 3002's original 5 million), which is displayed as 5 under Buy and 5 under BOT. See QUAD 4C. A new customer, CUST 3004, now enters a sell order (hit) for 50 million.

| >7.625 225 108.04 Cust | HIT Buy | TZ 16 BOT | Refno 68119 108.05+ Cust | Sell | 36 SOLD |
|---|---|---|---|---|---|
| QUAD 4C | | | | | |
| 3001 | 0 | 10 | 3005 | 0 | 16 |
| 3002 | 5 | 5 | 3004 | 50 | 0 |
| 3003 | 0 | 1 | | — | — |
| TOTL | 5 | 16 | | 50 | 16 |

New CUST 3004 must wait until the current workers are done (via keyboard entry or timer controlled system interval). Only after this, may CUST 3004 sell the additional 5 million to CUST 3002, while leaving 45 million unsold.

QUAD 4D shows the display after CUST 3004 has traded with CUST 3002. The asterisks next to the entries for CUST 3001 and CUST 3005 indicate that these initial traders are done or timed-out.

| >7.625 225 108.04 Cust | HIT Buy | TZ 21 BOT | Refno 68119 108.05+ Cust | Sell | 36 SOLD |
|---|---|---|---|---|---|
| QUAD 4D | | | | | |
| *3001 | 0 | 10 | *3005 | 0 | 16 |
| 3003 | 0 | 1 | 3004 | 45 | 5 |
| 3002 | 0 | 10 | | — | — |
| TOTL | 0 | 21 | | 45 | 21 |

As shown in QUAD 4D, above, because there is no longer a current worker, no one can control the trade to the exclusion of others.

As can be appreciated, various customer moves in the market are often fast paced—and on occasion position changes may occur almost simultaneously. An example of this may be a first customer hitting a second customer's bid of a certain size, via the buy/sell all key—an instant after a second customer has significantly increased the bid size—say from 5 to 20 million. In this situation, the Aggressor, within the system, has now taken much more than he planned. This situation can be very disturbing in a rapidly shifting market.

System logic addresses this problem by creating a supplemental state known as the "Second Look" State. If during processing, the passive side size is increased just prior to a hit or lift command, the system discriminates the very recent offer/bid from the earlier entries, via an "age" timer, i.e., a system interval that tracks the pendency of all bids and offers and creates a Second Look State whenever a hit/lift (via buy/sell all key) occurs while a Bid/Offer is under, e.g., two seconds old.

The Second Look, however, is limited. The Aggressor must complete the transaction excluding the new, i.e., "unaged" Bid/Offer. The new size is left untraded and others may add more offers/bids on this, the passive side—but these stay below the line. Even though the Aggressor did not fill the entire size displayed, the Aggressor assumes current worker status and has the right to:

1. Take the new size, creating the Workup State with the contra-trader;
2. Refuse the new size, the Aggressor refusal (via "done" command) sets the trade into the Workdown State; and
3. Take/hit a "partial" amount and then lose priority, with the system then entering workdown.

The Second Look State is governed by logic depicted in FIG. 9. In this arrangement, the trading command is entered-time stamped at block 1020. The extant passive maker entries are also entered, block 1030 and Test 1040 determines if. the Passive Side entries, PASS(ID) are "aged", i.e., not just recently entered. If yes, logic branches to Test 1090, to determine if PASS(ID) is the last entry, PASS-END. If not, the next one is incremented with logic returning to the sequence start.

A negative response to Test 1040 shifts logic to block 1050 wherein the new entry is parsed; the Aggressor is then given the opportunity to take the new size within the trade at Test 1060. If accepted, logic branches to Block 1080 and to the Workup State. If negative, logic is shifted to the Workdown State, Block 1070.

These principles are delineated in the following sequence of screen displays in QUADS 5A–5C below, wherein CUST 3001, 3002 and 3003 are showing 5 million, 1 million and 1 million, respectively, as having been bought. Just prior to the sell order by CUST 3007 (HIT ALL), CUST 3004 enters with a 1 million size. All size transacts, except this late 1.0 million as it had not "aged" sufficiently—as measured by system interval timer. This amount remains untraded and the system enters the Second Look State.

| QUAD 5A | | | | | |
|---|---|---|---|---|---|
| >7.625 225 | | TZ | | | |
| 108.04 | HIT | 7 | Refno 68119 | | 0 |
| Cust | Buy | BOT | Cust | Sell | SOLD |
| 3001 | 0 | 5 | 3007 | 0 | 7 |
| 3002 | 0 | 1 | | | |
| 3003 | 0 | 1 | | | |
| 3004 | 1 | 0 | | | |
| TOTL | 1 | 7 | | 0 | 7 |

If CUST 3007 decides to fill this outstanding 1.0 million size, the state moves out of "Second Look" and into the Workup State with CUST 3007 and CUST 3001 as Current Workers, as shown in QUAD 5B. As illustrated, CUST 3007 has also entered a sell order for a volume of 2 million.

| QUAD 5B | | | | | |
|---|---|---|---|---|---|
| >7.625 225 | | TZ | | | |
| 108.04 | HIT | 8 | Refno 68115 | | 0 |
| Cust | Buy | BOT | Cust | Sell | SOLD |
| 3001 | 0 | 5 | 3007 | 2 | 8 |
| 3002 | 0 | 1 | | | |
| 3003 | 0 | 1 | | | |
| 3004 | 0 | 1 | | | |
| TOTL | 0 | 8 | | 2 | 8 |

If, however, CUST 3007 passes, the trade goes to the Workdown State as shown in QUAD 5C. New CUST 3005 now enters and is positioned below the line and can only trade after CUST 3001 is done and CUST 3004 trades.

| QUAD 5C | | | | | |
|---|---|---|---|---|---|
| >7.625 225 | | TZ | | | |
| 108.04 | HIT | 7 | Refno 68117 | | 0 |
| Cust | Buy | BOT | Cust | Sell | SOLD |
| 3001 | 0 | 5 | 3007 | 0 | 7 |
| 3002 | 0 | 1 | | | |
| 3003 | 0 | 1 | | | |
| 3004 | 1 | 0 | | | |
| 3005 | 1 | 0 | | | |
| TOTL | 1 | 7 | | 0 | 7 |

The final state for trading logic is known as the Workdown State and it occurs when the original Aggressor takes less than all of the size showing on the passive side. The remaining size must be worked down to complete the trade. This rewards those customers that show bids/offers (their intent to buy/sell), thus providing liquidity in the market. If the original Aggressor returns for the remaining size from the passive size, the Workup State is initiated. Another trader from the active side may "Workdown" the remaining passive side quantity and the trade will go to the Workup State—with this new trader as the current worker—if all the remaining size from the original Bid/Offer State is taken.

Figure 10:
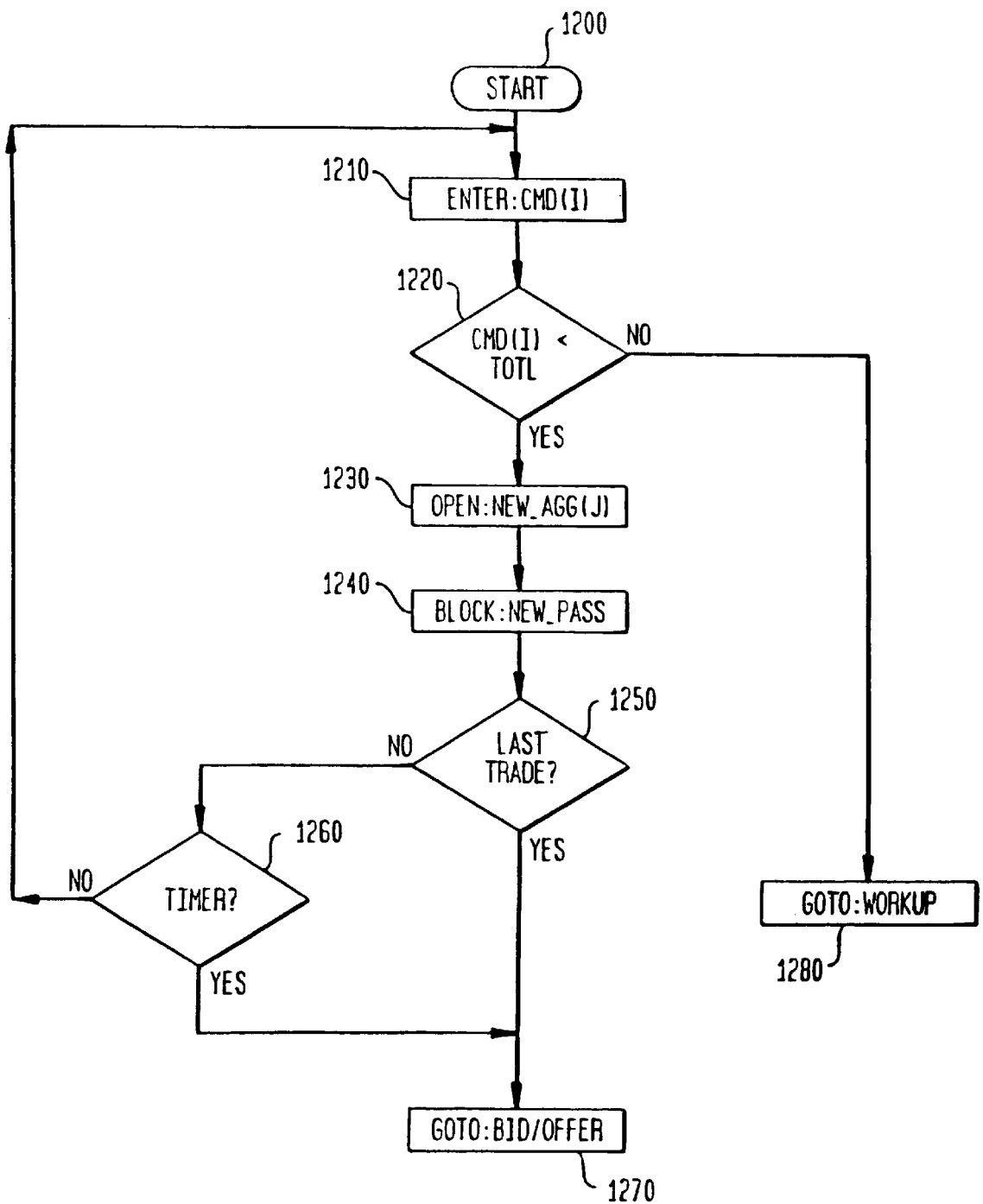
FIG. 10 is a logic diagram for the Workdown State.

The Workdown State allows new Aggressors to complete the remaining un-hit bids on the passive side with logic conforming to the flowchart of FIG. 10. In this process, the Trading command, CMD(I), is entered at block 1210. At Test 1220, the system confirms that the trade is for less than the total passive side, TOTL. If not, logic branches to block 1280 and is directed to the Workup State.

A positive response to Test 1220 passes logic to block 1230 wherein the system opens trading to new Aggressors, to complete the pending passive side volume. However, no new passive side entries are permitted, block 1240, for the trade duration. Test 1250 confirms the last trade via timer Test 1260; if either results in a "Yes", Workdown is terminated and the process returns to the Bid/Offer State.

Importantly, new traders presenting on the passive side must wait until all the remaining original size is worked down—and their position is held below the line. This is depicted in the following QUADS 6A–6C.

| QUAD 6A | | | | | |
|---|---|---|---|---|---|
| >7.625 225 | | TZ | | | |
| 108.04 | HIT | 15 | *108.04+ | | 25 |
| Cust | Bid | BOT | Cust | Offer | SOLD |
| 3001 | 5 | 0 | 3007 | 25 | 0 |
| 3002 | 10 | 0 | | | |
| TOTL | 15 | 0 | | 25 | 0 |

In QUAD 6A, the Bid/Offer State is depicted with CUST 3001 showing a bid of 5 million. As the Aggressor, CUST 3001 lifts an offer from CUST 3007, but for only 5 million of CUST's 3007 showing of 25 million; leaving 20 million on the passive side. See QUAD 6B.

| QUAD 6B | | | | | |
|---|---|---|---|---|---|
| >7.625 22 | | TZ | Refno 68118 | | |
| 108.04 | | 11 | 108.04+ | TAK | 5 |
| Cust | Buy | BOT | Cust | Sell | SOLD |
| *3001 | 0 | 5 | 3007 | 20 | 5 |
| TOTL | 0 | 5 | | 20 | 5 |

At this juncture, if CUST 3006 enters with 10 million offer, it must wait until the original passive side clears; CUST 3006 is thus kept below line as the remaining size is worked down. See QUAD 6C.

| QUAD 6C | | | | | |
|---|---|---|---|---|---|
| >7.625 225 | | TZ | Refno 68118 | | |
| 108.04 | | 11 | 108.04+ | TAK | 5 |
| Cust | Buy | BOT | Cust | Sell | SOLD |
| *3001 | 0 | 5 | 3007 | 20 | 5 |
|  |  |  | 3006 | 10 | 0 |
| TOTL | 0 | 5 |  | 20 | 5 |

A trade is cleared when that price point engenders no further buyers or sellers. A "clear" button will resurrect a new Bid/Offer State, retaining original makers size from the active side—unless superceded, and remaining untraded size from the passive side.

Figure 11:
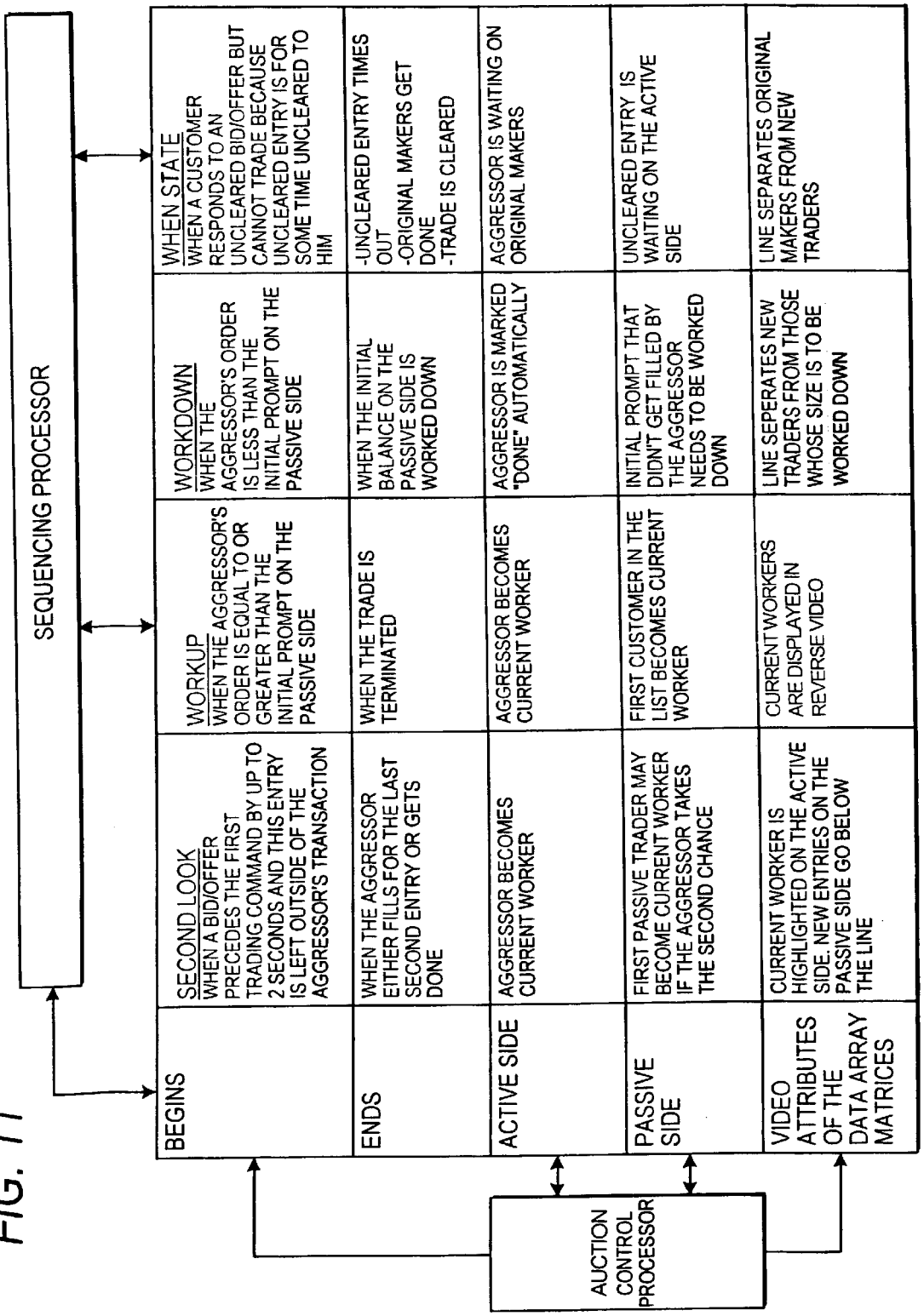
FIG. 11 is a trading logic summary table.

The logic associated with the five states discussed herein is summarized in tabular form in FIG. 11. The foregoing system design has resulted in a dramatic increase in efficiency and reduction in order errors on the trading floor.

Figure 3A:
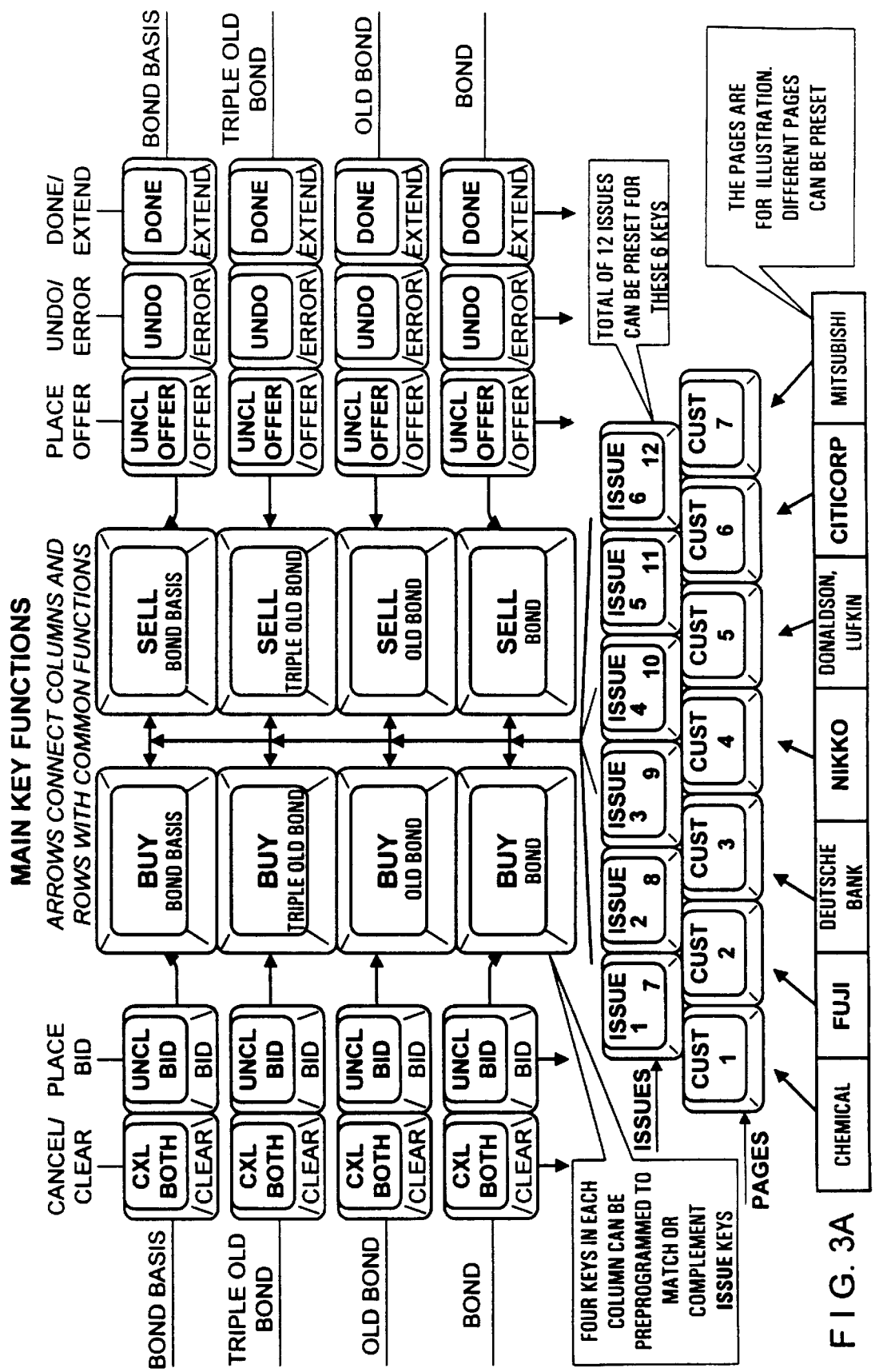
FIG. 3 depicts the salient features of the dedicated keypad.
Figure 3B:
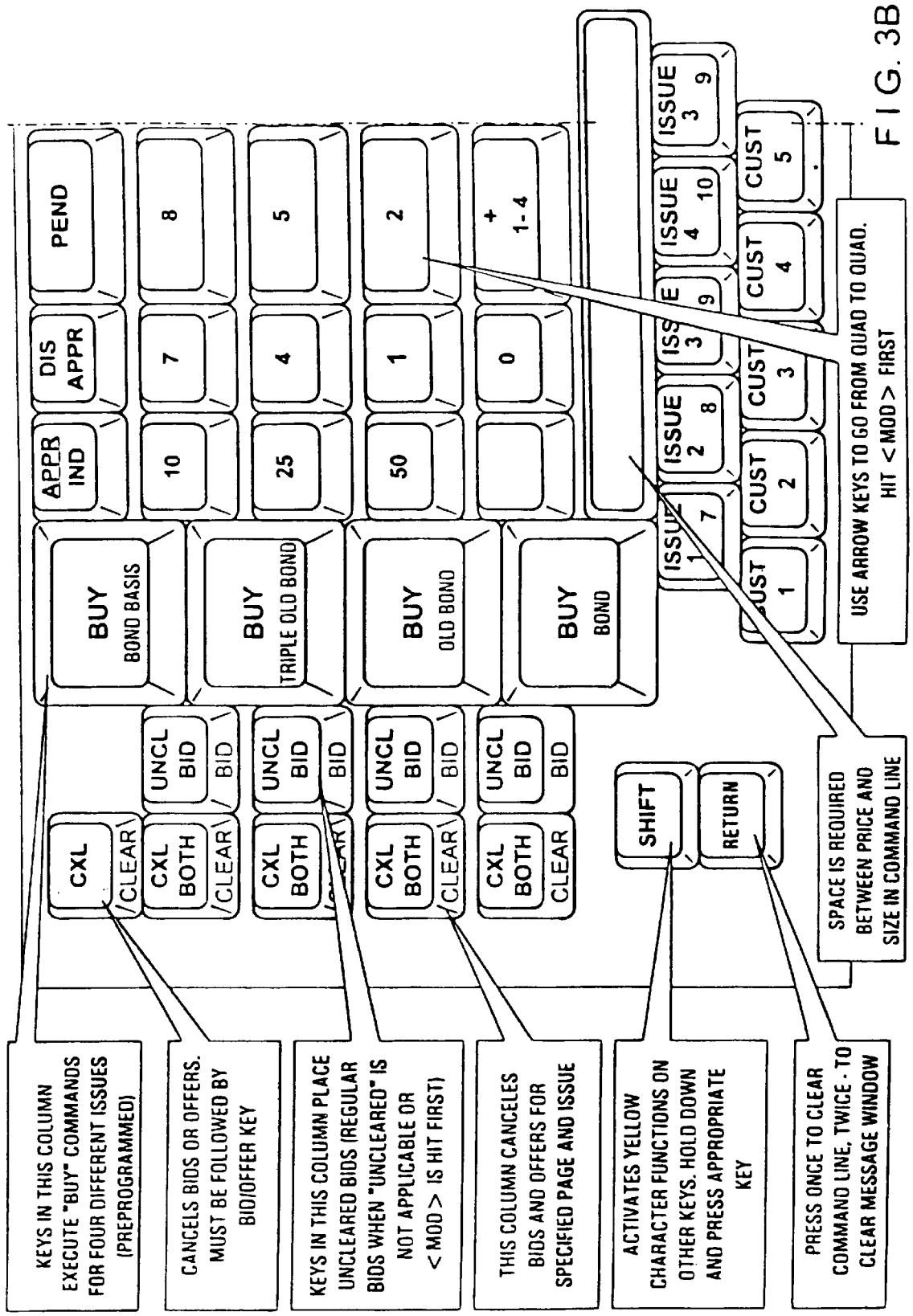
Figure 3C:
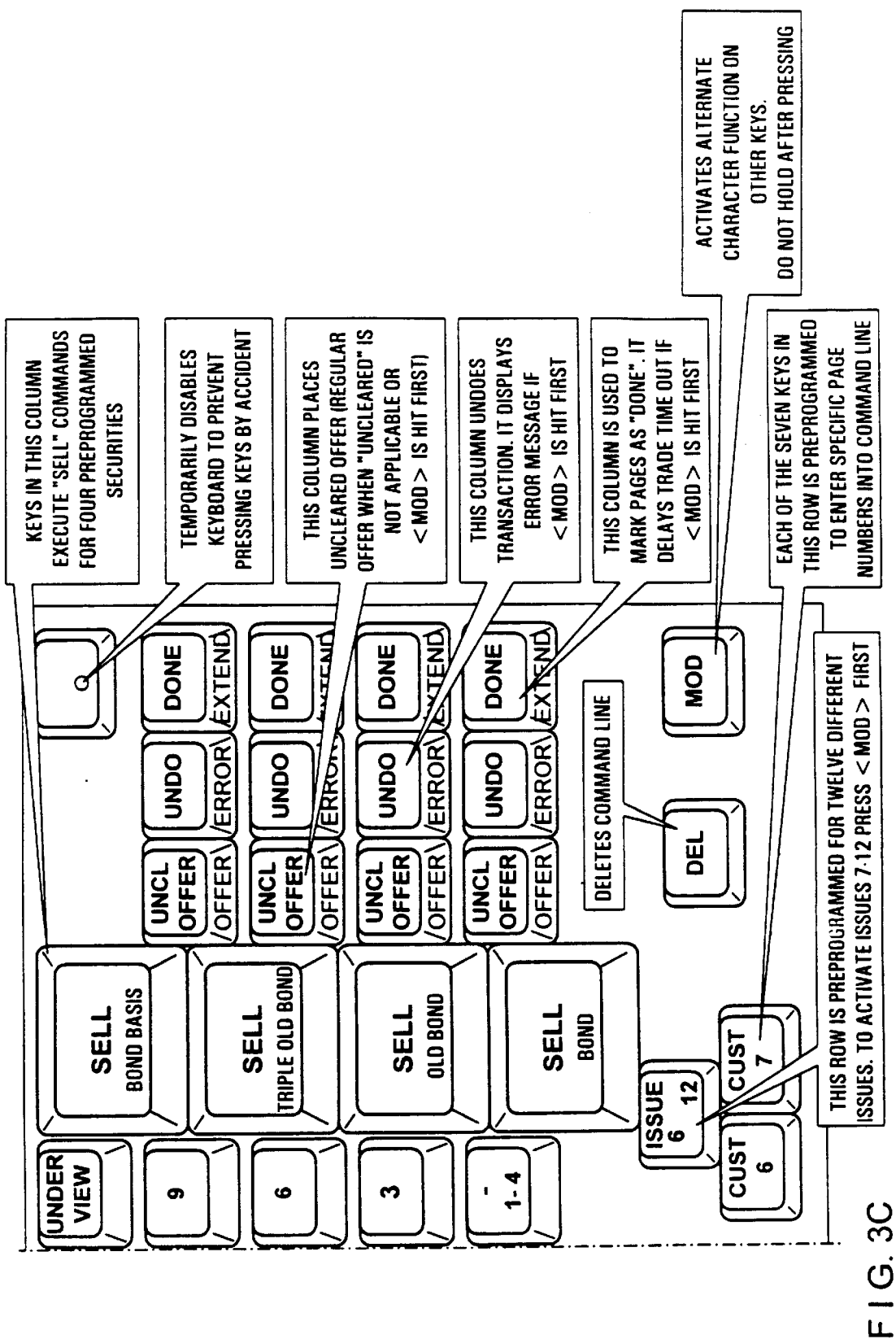

The often frenetic environment of trading, and the entry of commands on the preferred dedicated keypad shown in FIG. 3, and the human factor of customers changing their minds all contribute to the possibility that a trade has been made in error. More particularly, errors can arise due to incorrect entries into the system, a miscommunication between a broker and trader, and the like. These errors can often force a "principal" broker into an unintended position during a trade.

This invention preferably provides ways for the broker to effectively "undo" a trade, either by cancelling a pending order, or rolling-back executions during a trade state. As shown in FIG. 3, the keypad provides CANCEL, DONE, and UNDO keys to facilitate this process. The function of these keys when the system is in a particular state is described below, it being understood that the names given to these keys are arbitrary and any input means can be used to affect the desired action(s).

In the Bid-Offer State, CANCEL functions to remove a maker's existing markets from one or more instruments in this one command stroke.

In the When State, CANCEL functions to remove a maker's markets only if there are no pending active BUY or SELL orders against it. Also, DONE.functions to remove a potential aggressor, as well as trade participants, from trading lists before orders are matched.

During the Workdown State, CANCEL functions to remove any remaining passive maker's markets. DONE performs the same function as the CANCEL function and also allows the passive trade participants in the Workdown State to remove themselves from trading lists, thereby effectively removing their committed sizes before the system has had a chance to execute them. UNDO functions to "unroll" the trade and reduce the size shown to customers if executed during a predefined time period after the initial trade. Additionally, the UNDO function proportionally reduces the amount traded by all passive makers. The restriction of a predefined time period discourages one player from taking unfair advantage of this correction facility. Analogously, if more than one trader participated in the trade, then the UNDO function causes the trader to join the contra side for the size desired to be undone. The UNDO function can be invoked at any time by any participant, on the active side or the passive side; the system uses appropriate logic to maintain the fairness of the trading protocol.

During the Workup State, a trader can use the DONE function to remove him/herself from being a participant from the active side or the passive side, or both sides simultaneously, regardless of the size traded or solicited. Thus, the DONE function logically removes the trader from the trade. The UNDO function can also roll back the trade provided that the first active trader has executed this function with a predefined time period following the trade. If the UNDO function is not invoked during this predefined time period, or the trader is not the first active trader, then the trader is entered in the queue to buy or sell on the contra side immediately Preferably, the trader is placed at the top of the list so that the UNDO function can be effectively invoked immediately, provided there is a contra trader. Most preferably, the rights of the first active and passive traders will be maintained to assure fairness.

Although the invention has been described in detail for the purpose of illustration, it is to be understood that such detail is solely for that purpose and that variations can be made therein by those skilled in the art without departing from the spirit and scope of the invention:except as it may be limited by the claims.

What is claimed is:

1. A method implemented by a programmed computer system for trading a volume of an item between participants, comprising:
providing a bid/offer system state to enable participants to enter into the system bids and offers at select prices and volumes for the item;
presenting the bids and offers to the participants;
receiving a first hit or lift trade command from a first participant, responding to presented bids and offers, to transact a trade of a desired volume of the item at a desired price;
in response to the first trade command, transitioning from the bid/offer system state to a trading system state to transact a trade of the item at a defined price corresponding to the desired price, and to transact in response to an additional trade command a trade of an additional volume of the item at the defined price; and
if a bid or offer hit or lifted by the first trade command has not aged, transitioning to a second look system state to enable the first participant to refuse to trade at least a portion of the volume of the item associated with the unaged bid or offer.

2. The method of claim 1, wherein the desired volume is all bid or offered volume.

3. The method of claim 1, wherein the first participant is enabled to refuse to trade the entire volume associated with the unaged bid or offer.

4. The method of claim 1, wherein if the first participant refuses to trade a portion of the entire volume associated with the unaged bid or offer, enabling a second participant to enter a second hit or lift trade command to trade the portion at the defined price.

5. The method of claim 1, wherein a bid or offer is not aged if it had been entered into the system within a given period of time prior to receipt of the trade command.

6. The method of claim 5, wherein the given period of time is about 2 seconds.

7. The method of claim 1, wherein a bid or offer is not aged if it increased the total volume of the item that was hit or lifted within a given period of time prior to receipt of the trade command.

8. A method implemented by a programmed computer system for trading a volume of an item between participants, comprising:
providing a bid/offer system state to enable participants to enter into the system bids and offers at select prices and volumes for the item;

presenting the bids and offers to the participants;

receiving a first hit or lift trade command from a first participant, responding to presented bids and offers, to transact a trade of a desired volume of the item at a desired price;

in response to the first trade command, transitioning from the bid/offer system state to a trading system state to transact a trade of the item at a price defined by the desired price, and to transact in response to an additional trade command a trade of an additional volume of the item at the defined price; and determining that the first participant may not have intended to trade the entire volume that was hit or lifted by the trade command, and responsively entering a second look system state enabling the first participant to refuse to trade at least a portion of the volume of the item that the first participant may not have intended to trade.

9. The method of claim 8, wherein the desired volume is all bid or offered volume.

10. The method of claim 8, wherein the first participant is enabled to refuse to trade the entire volume of the item that the first participant may not have intended to trade.

11. The method of claim 8, wherein if the first participant refuses to trade a portion of the volume of the item that the first participant may not have intended to trade, enabling a second participant to trade the refused volume at the defined price.

12. The method of claim 8, wherein said determining step determines that the first participant may not have intended to trade the entire volume if a bid or offer hit or lifted by the first trade command has not aged.

13. The method of claim 8, wherein said determining step determines that the first participant may not have intended to trade the entire volume that was hit or lifted if that volume had been increased by a bid or offer within a given period of time prior to receipt of the hit or lift.

14. A method implemented by a programmed computer for trading a volume of an item between participants using a system of networked workstations, comprising:

providing a bid/offer system state wherein passive participants enters bids or offers for the item at associated select prices and volumes, and an active participant hits or lifts one or more entered bids or offers to trade a desired volume of the item at a desired price;

determining whether a bid or offer that was hit or lifted had aged;

if the bid or offer had aged, executing a trade of the associated volume of the item at the desired price; and if the bid or offer had not aged, providing a second look system state that allows the active participant to decide whether or not to trade the volume of the item associated with the unaged bid or offer.

15. The method of claim 14, wherein a bid or offer is not aged if it was received within a given period of time prior to being hit or lifted.

16. The method of claim 15, wherein the given period of time is about 2 seconds.

17. The method of claim 14, wherein a bid or offer is not aged if it caused the total volume of bids or offers that was hit or lifted by the active participant to be increased within a given period of time prior to the bid or offer being hit or lifted.

18. The method of claim 14, wherein the active participant in the second look state may refuse to trade all or a portion of the volume of the item associated with the unaged bid or offer.

19. The method of claim 14, wherein the hit or lift entered by the active participant is a command to hit or lift all of the volume bid or offered by the passive participants.

20. A method implemented on a distributed workstation computer system for trading an item between passive participants and an aggressor participant, the method comprising:

providing a bid/offer system state wherein the passive participants participate by entering bids or offers at select prices and volumes for the item;

distributing the bids or offers to the workstations;

receiving a hit or lift from the aggressor participant in response to one or more of the bids or offers to trade a desired volume of the item at a desired price; and transitioning to a trading system state wherein:
(a) a trade transaction is executed, at a defined price set by the hit or lift, between the aggressor participant and each passive participant whose bid or offer had been hit or lifted by the aggressor participant;
(b) a period of exclusivity is provided during which the aggressor participant and a designated passive participant may control trading by transacting additional volume of the item with each other at the defined price to the exclusion of other participants desiring to participate in trading; and
(c) upon termination of the period of exclusivity, new trade transactions involving the other participants are tested for and executed at the defined price without providing the other participants a period of exclusivity to control trading.

21. The method of claim 20, wherein said designated passive participant is the first passive participant to have entered a bid or offer that was hit or lifted.

22. A method implemented on a distributed-workstation computer system for trading an item between participants, said method comprising:

providing a bid/offer system state wherein a first participant enters a bid or offer for the item at a select price and volume;

receiving from a second participant a trade command to hit or lift the bid or offer;

entering a trading system state wherein a trade transaction is executed between the first and second participants for a volume of the item at a defined price, and wherein (a) the first and second participants are provided a period to control trading, during which they may transact with each other additional volume of the item at the defined price to the exclusion of other participants desiring to participate in the trade, and (b) upon conclusion of the period, a new trade transaction is automatically executed at the defined price in response to a trade command entered by another participant without providing the other participant a period to control the trade.

23. The method of claim 22, wherein the trade command entered by the other participant is entered during the period to control trading but not executed until the conclusion of said period.

24. A method implemented on a distributed-workstation computer system for trading an item between participants, said method comprising:

providing a bid/offer system state wherein a first participant enters a bid or offer for the item at a select price and volume;

receiving from a second participant a trade command to hit or lift the bid or offer;

entering a trading system state wherein a trade transaction is executed between the first and second participants for a volume of the item at a defined price, and wherein (a) the first and second participants are provided a period to control trading, during which they may transact with each other additional volume of the item at the defined price to the exclusion of other participants desiring to participate in the trade, and (b) upon conclusion of the period, new transactions are automatically executed at the defined price in response to a plurality of trade commands entered by other participants without providing the other participants a period to control the trade.

25. The method of claim 24, wherein the plurality of trade commands are entered during the period to control trading but not executed until the conclusion of said period.

26. A system for transacting the purchase and sale of a select item between participants, the system comprising:
   a first workstation that receives from a first participant a bid or offer at a select price and volume for the item;
   a second workstation that receives from a second participant a hit or lift of the bid or offer; and
   a central server that is coupled to the workstations for communication to the server of the bid or offer and hit or lift, and that transitions between a plurality of states which define the ability of participants to participate in trading, wherein the plurality of states includes a first state enabling the bid or offer to be received, and a second state entered in response to the hit or lift being received within a given time period of the bid or offer, said second state enabling the second participant to refuse the sale or purchase of at least a portion of the volume of the item that was hit or lifted.

27. The system of claim 26, wherein one of the first and second participants is a broker, and the other of the first and second participants is a customer.

28. The system of claim 26, further comprising:
   a communication server coupled to the central server and to a remote communications link; and
   a remote server located remotely from the communication server and coupled to the communication server via the remote communications link; wherein:
   said first workstation is one of a plurality of first workstations located locally to the central server and coupled to the central server via a local network, each of said first workstations operated by a broker participant; and
   said second workstation is remotely located from said central server and coupled to said central server via a remote communications link, and operated by a customer participant.

29. A system for trading an item between an aggressor participant and one or more passive participants, comprising:
   a first workstation that receives bids or offers from the passive participants for the item at select prices and volumes;
   a second workstation that receives a trade command from the aggressor participant to hit or lift one or more of the bids or offers in order to sell or buy a desired volume of the item at a desired price; and
   a programmed computer, coupled to the workstations, that (1) provides a system bid/offer state enabling the passive participants to participate by entering bids or offers with respect to the item and that, in response to a hit or lift of one or more of the entered bids or offers, and (2) transitions to a system trading state which (a) executes a trade transaction in accordance with the hit or lift at a defined price set by the hit or lift, (b) provides a period of exclusivity enabling the aggressor participant and a designated passive participant to control subsequent trading by executing transactions between the aggressor and designated passive participant of additional volume of the item at the defined price to the exclusion of other participants desiring to participate in the trading, and (c) upon termination of the period of exclusivity, executes new trade transactions involving the other participants at the defined price without providing the other participants a period of exclusivity to control trading.

30. The method of claim 29, wherein the other participants may enter trade commands for the new trade transactions during the period of exclusivity, and the new trade transactions are only executed, if at all, after the conclusion of said period.

31. The system of claim 29, wherein said programmed computer determines whether a bid or offer hit or lifted by the trade command is aged and, if the bid or offer is not aged, transitions to a second look state in which the aggressor participant is enabled to refuse the sale or purchase of at least a portion of the volume of the item associated with the unaged bid or offer.

* * * * *